United States Patent Office 2,846,325
Patented Aug. 5, 1958

2,846,325

REFRACTORY VITREOUS CERAMIC COATING MATERIALS

Dwight G. Bennett, Champaign, and William J. Plankenhorn, Lombard, Ill., assignors to the United States of America as represented by the Secretary of the Air Force No Drawing. Application February 7, 1956
Serial No. 564,093

5 Claims. (Cl. 106—54)

This invention relates to refractory vitreous ceramic coating materials and more particularly relates to new refractory vitreous ceramic coatings utilizing improved frits of the barium-boro-silicate type. The ceramic coatings of this invention applied to various metal surfaces are significantly effective for improving the high temperature characteristics of the treated materials.

The need for structural materials capable of withstanding high temperature conditions over prolonged periods of time has been greatly emphasized in recent years particularly in connection with the development of jet propulsion and rocket engines. The availability of suitable metals and alloys for the construction of combustion chambers and related engine components exposed during operation to high temperatures of about 1800 to 2000° F. or higher has been considerably limited. One approach to the problem has been the application of ceramic coating materials as a protective layer over the surface of the available metals and alloys which are most suitable for the stated purposes. It has been found, for example, that the metallic member coated with various ceramic materials may be significantly protected during high temperature operation against oxidation and corrosion whereby the mechanical strength of the member may be maintained for a longer period of time. In some cases, the protection afforded the metallic member by the ceramic coating has made possible the use of somewhat higher operating temperatures than could be otherwise tolerated by the non-treated metallic surface since most of the strength properties of the metal are beneficially affected.

Although varying degrees of success have been attained by this approach, the use of the prior art ceramic coating materials has not proven entirely satisfactory due to serious limitations imposed upon the ceramic coating compositions by the high temperature and the other operational requirements. For example, it is essential that the ceramic coating formulations generally comprising a frit and mill additions therefor contain ingredients which are capable of withstanding the extremely high temperatures without causing disintegration of the ceramic coating material or undesirable reactions with the metal surfaces over which it is applied. Preferably, the coating composition should not give rise to poisonous fumes at the elevated temperatures which create hazards to personnel during the preparation and application stage and also to persons that may become exposed to the fumes during operation of the aircraft utilizing the treated metal components. Furthermore, extreme difficulties have been experienced in formulating a sufficiently satisfactory refractory vitreous ceramic coating material capable of withstanding temperatures to 2000° F. or higher for any extended period of time without undergoing decomposition or deterioration either because of thermal oxidation or from contact with hot and corrosive gases. In addition to these requirements, it is essential that the coating material possess and also be capable of retaining a coefficient of expansion comparable to that of the metal in order to resist flaking and cracking upon deformation of the metal.

We have now discovered that frits containing optical glass forming components and other essential compounding ingredients including the oxides of bismuth, zinc, calcium, cerium and titanium, the latter being interchangeably used with chromium, may be processed with suitable mill additions to provide excellent coating compositions for certain metals, notably various stainless steels and nickel alloys known as "Inconel."

The metal coating frits or glasses referred to herein as being of the barium-boro-silicate type, prepared and processed at the mill as hereinafter described in detail, provide ceramic coating materials which are not only highly effective for use at temperatures up to 2000° F. or thereabouts but which also have the desirable properties including durability, non-toxicity and excellent bonding properties in the absence of flaking, cracking or spalling under drastic thermal shock conditions.

It is, therefore, an object of this invention to provide refractory vitreous ceramic coating compositions which when bonded to various metallic surfaces will effectively protect the same at temperatures from about 1800 to 2000° F. or thereabouts for extended periods of use.

It is another object of this invention to provide new frit compositions of the barium-boro-silicate type containing no ingredients of an extremely toxic nature.

It is a further object of this invention to provide frits of the barium-boro-silicate type which may be compounded into a ceramic coating material which is particularly suitable for protecting stainless steel or nickel alloy structural components of jet engines and the like which are exposed to temperatures up to 2000° F. or thereabouts.

It is a still further object of this invention to provide articles of manufacture comprising a metal body coated with a refractory vitreous ceramic coating material of non-toxic composition which articles when used as structural components of a propulsion system and exposed to drastic oxidation and corrosion conditions will withstand operating temperatures of about 2000° F. over prolonged periods of time.

Other objects and advantages will become apparent as this specification proceeds.

In accordance with the present invention, the high temperature resistant barium-boro-silicate glasses or frits for use in preparing the refractory vitreous ceramic coating materials have the following oxide compositions based on the total weight of the frit: silicon dioxide ($SiO_2$), 34 to 40%; barium oxide ($BaO_2$), 22 to 28%; boron oxide ($B_2O_3$), 5 to 10%; bismuth oxide ($BiO_2$), 8 to 12%; calcium oxide ($CaO$), 4 to 6%; zinc oxide ($ZnO$), 4 to 6%; cerium oxide ($CeO_2$), 4 to 6.5%; and chromium oxide ($Cr_2O_3$), 3 to 10%; the latter component being optionally replaceable with a like amount of titanium oxide ($TiO_2$), if desired.

The raw batch materials and the quantities thereof suitable for use in preparing frits of the above formulations are readily determinable by those skilled in the art and include the oxides of the various ingredients as well as other substances convertible thereto during smelting of the ingredients for forming the frit. Suitable raw batch materials providing the essential ingredients include quartz ($SiO_2$), barium carbonate ($BaCO_3$), boric acid ($H_3BO_3$), bismuth nitrate ($Bi(NO_3)_3 \cdot 5H_2O$), bismuth trioxide ($Bi_2O_3$), calcium carbonate ($CaCO_3$), cerium oxide ($CeO$), zinc oxide ($ZnO$), chromium oxide ($Cr_2O_3$), and titanium dioxide ($TiO_2$).

Typical raw batch formulas yielding the barium-boro-silicate type frits suitable for use as herein contemplated are illustrated by the following formulations used in making preferred embodiments herein designated as Frits 353 and 418 respectively, it being understood that other formulations of the same ingredients within the previously disclosed ranges may be similarly utilized for preparing highly useful frits.

| | Raw Batch Formula (percent by wt.) | | Oxide Composition (percent by wt.) | |
|---|---|---|---|---|
| Frit Number | 353 | 418 | 353 | 418 |
| Quartz | 29.0 | 31.2 | $SiO_2$ | 37.0 | 37.0 |
| Boric acid | 11.1 | 12.0 | $B_2O_3$ | 8.0 | 8.0 |
| Barium carbonate | 25.3 | 26.3 | BaO | 25.0 | 25.0 |
| Bismuth trioxide | | 6.2 | $BiO_2$ | 10.0 | 10.0 |
| Bismuth nitrate | 15.9 | 4.2 | | | |
| Cerium oxide | 3.9 | 4.2 | $CeO_2$ | 5.0 | 5.0 |
| Zinc oxide | 3.9 | 4.2 | ZnO | 5.0 | 5.0 |
| Calcium carbonate | 7.0 | 7.5 | CaO | 5.0 | 5.0 |
| Chromium oxide | 3.9 | | $Cr_2O_3$ | 5.0 | |
| Titanium dioxide | | 4.2 | $TiO_2$ | | 5.0 |
| | 100.0 | 100.0 | | 100.0 | 100.0 |

The physical form of the various ingredients used in making the frit is not of extreme importance, it being preferred, however, to use materials in a relatively finely divided form to enable effective mixing during smelting while materially reducing the smelting time which would be otherwise required. In this connection, all of the bismuth oxide in a frit batch may be added as the oxide, but when all or a portion of the bismuth oxide forming ingredient is added as bismuth nitrate, the nitrate acts as an oxidizing agent which, during its volatilization, permeates the batch and serves to insure the complete oxidation of the melted batch components.

It will be seen from the foregoing that the barium-borosilicate type frits of this invention are characterized by the presence of from 61 to 78% by weight of the optical glass forming components considered on an oxide basis consisting of the cumulative amounts of silicon, barium and boron oxides respectively. The balance of the frit composition consisting of from 22 to 39% of the component oxides is made up of bismuth, cerium, calcium, zinc, chromium or titanium as previously indicated. Additional amounts of chromium oxide, titanium dioxide or both may be added at the mill as hereinafter discussed in order to modify the properties of the coating material. It should be accordingly understood that the quantities of oxide components heretofore set forth relate to the frit and not to the overall composition of the ceramic coating materials which contain additional ingredients which may include diaspore, enamelers clay, borax, etc.

With reference to the specific oxide components of the frit, it will be noted that in addition to the primary substances characterizing the frit as of the optical glass or barium-boro-silicate type free from alkali metals and alumina, the mixture contains no beryllia which though used in prior art formulations is highly objectionable due to its marked toxicity. The use of lead as a fluxing agent is also eliminated, the incorporation of bismuth oxide in lieu thereof constituting a significant element of the present invention. It has been found that bismuth oxide or the oxide-forming salts such as bismuth nitrate not only have the advantage of being non-toxic but are at least as good a flux as lead oxide. It has also been observed from long heat tests of coatings utilizing the bismuth-containing frits of this invention that though bismuth tended to vaporize slightly, subsequent deposition of the metallic oxide condensate served to seal coating imperfections thereby providing a further advantage. Calcium and zinc oxides also serve as fluxes and cerium oxide is added to utilize its properties as a refractory or stable, high melting opacifier which, since it is unaffected by furnace atmospheres, retains its ability to reflect incident radiant energy.

The use of chromic oxide in the frit indicated by the formulation of Frit 353 contributes greatly to the high temperature stability of the metal coating frit or glass. Titanium dioxide to the extent of about 3 to 10% in frits of the type indicated increases the fluidity or workability of the glass. With its use, thermal expansion properties of the glass can be adjusted toward an improved fit of the coating to the metal. Titanium dioxide imparts turbidity or opacity to the glass and also increases the chemical stability thereof thereby improving resistance of the coating material to attack by acidic or alkaline solutions. When titanium dioxide is used in conjunction with cerium oxide, a stable and heat resistant compound, presumably cerium titanate is apparently formed as indicated by X-ray analysis and also by the development of a characteristic faint yellow color which becomes particularly noticeable after extended periods of heating. Since it has been found that chromic oxide may be effectively added in the coating mill batch as previously indicated, it is preferred to use titanium dioxide in the frit formulation as shown in Frit 418 in order to take advantage of its desirable properties.

The raw frit batch is compounded by combining the ingredients within the proportions suitable for providing the oxide compositional ranges previously indicated, the materials being suitable screened through a 20-mesh sieve, thoroughly mixed and charged to a hot frit smelter. The preferred smelting temperature is about 2550° F., maturity of the melt being indicated by appearance of a smooth surface and the ability to draw a uniform thread of glass from the melt. The smelting requires about one hour at the designated temperature, however, longer or shorter smelting periods may be used depending upon the proportions of materials used in the raw frit batch and the size of the batch. The molten material upon reaching maturity is poured into cold water causing the material to shatter thereby forming the frit. The shattered material is then dried and ground to desired size, suitably to pass a 30 to 40-mesh sieve.

Although useful ceramic coatings can be made with the frits of the present invention utilizing conventional mill addition ingredients including enamelers clay, water and electrolyte, optionally including borax and diaspore, it is preferred to include additional amounts of either chromium oxide or titanium dioxide as mill batch formula ingredients for best results. In cases where prolonged protection of stainless steels and nickel alloys against high temperatures is the prime requirement, substantial amounts of chromium oxide ranging from 10 to 40 parts by weight per 100 parts of frit used in the mill batch may be added advantageously. This oxide masks the heat reflecting components of the frit ($CeO_2$ and $TiO_2$) and promotes heat transfer through the metal while not substantially altering the property of the coating to shield the metal from corrosive agents such as oxygen. In cases where metal protection and maximum reflection of radiant energy are more desirable, a more suitable ceramic coating is obtained when chromia is not added at the mill.

When no chromium oxide is included in the mill batch formula, the addition of about 10 to 25 parts by weight of titanium dioxide per 100 parts of frit in the mill batch formula have been found to be advantageous for extending the resistance of the ceramic coating against attack by acids or alkalis as well as improving other properties of the mixture. All of the mill added components exclusive of the water become an integral part of the ceramic coating upon application of the maturing fire.

Examples of various mill batch formulas suitable for use with the barium-boro-silicate type frits herein disclosed are listed below, the formulations including Frits 353 and 418 for illustrative purposes. The amount of each component is expressed as parts by weight per 100 parts of frit used in the batch.

Mill batch formulas

| Ceramic Coating No | 353-1 | 353-2 | 353-3 | 353-4 | 418-1 | 418-2 | 418-3 | 418-4 | 418-5 |
|---|---|---|---|---|---|---|---|---|---|
| Frit | 100 | 100 | 100 | 100 | 100 | 100 | 100 | 100 | 100 |
| Chromium oxide | 0 | 20 | 0 | 0 | 0 | 0 | 0 | 25 | 40 |
| Titanium dioxide | 0 | 0 | 25 | 0 | 0 | 20 | 10 | 0 | 0 |
| Diaspore | 0 | 0 | 0 | 15 | 0 | 0 | 0 | 0 | 0 |
| Enamelers clay | 7 | 7 | 7 | 7 | 7 | 7 | 7 | 6 | 6 |
| Borax | 3/4 | 3/4 | 0 | 0 | 3/4 | 0 | 0 | 0 | 0 |
| Water | 50 | 50 | 50 | 50 | 50 | 50 | 50 | 40 | 40 |

In each of the above examples, for every 100 parts by weight of the frit, from 6 to 7 parts of enamel clay and from 40 to 50 parts of water were used with 0.75 part of borax being optionally incorporated in some of the mill batches. Diaspore may also be added as illustrated in the coating formulation designated as 353-4. The variation in the inclusion of either chromia or titania in the mill batch is readily seen in the examples. The mixtures set forth in each of the above mill batch formulas were milled in conventional porcelain ball mills until a desirable degree of fineness was attained, a suitable test thereof ordinarily consisting of passage through a 325-mesh sieve with less than about 5% of the milled material being retained thereby.

Application of the ceramic coatings or slips may be accomplished by spraying, dipping or by any other suitable means, it being necessary to first prepare the metal surface for proper bonding with the ceramic coating material. For this purpose, the metal to be coated is initially heated for about 3 minutes at 1500 to 1600° F. to remove all oils, greases or other foreign substances adhering to the surface. It is then given a moderately heavy sandblasting to remove all scales and to produce a surface that is clean and preferably slightly roughened since such a surface usually provides the best coating adherence.

When the coating is to be applied by dipping, the consistency of the slip should be adjusted with additions of water (up to 40% on a wet basis) and/or electrolytes to give a dry weight pick-up equivalent to from 20 to 25 grams on a sandblasted steel plate one foot square (both sides being covered). Such dipping weights will result in a fired coating of from 2 to 2.5 mils in thickness. Where thinner or thicker coatings may be desired, the set and pick-up of the coating slip may be either increased or decreased accordingly for producing the suitable result. The metallic member to be coated is immersed in the adjusted slip, care being exercised to provide complete coverage of the surface or surfaces. It should then be removed and set in such a position for draining as to promote a thin uniform coating of all surfaces to be treated and to facilitate draining of excess coating slip. After draining is complete and excess coating material is removed from the edges of the metal member, the coating should be dried in circulating warm air at 80° to 150° F. For application of the coating material to the metal member by spraying, the consistency of the slip may be adjusted as desired or necessary.

The coated, drained and dried metal parts are then fired in either an electric furnace or a fuel fired muffle furnace. The firing time and temperature may be varied depending upon factors such as the metal thickness, specific coating composition, furnace load, heat capacity of the furnace, etc. Satisfactory maturity of the coatings of the present invention is ordinarily achieved with a firing time of about 6 minutes and a firing temperature of from 1750 to 1950° F. as seen in the following data:

| Coating No. | Firing time (minutes) | Firing temp. (°F.) |
|---|---|---|
| 353-1 | 6 | 1,750 |
| 353-2 | 6 | 1,800 |
| 353-3 | 6 | 1,950 |
| 353-4 | 6 | 1,850 |
| 418-1 | 6 | 1,800 |
| 418-2 | 6 | 1,850 |
| 418-3 | 6 | 1,800 |
| 418-4 | 6 | 1,800 |
| 418-5 | 6 | 1,850 |

A part of the subject matter of this invention is a new article of manufacture comprising a stainless steel or nickel alloy structural member coated with a ceramic coating layer characterized as herein disclosed by the presence of the oxides of silicon, barium, boron, bismuth, zinc, calcium, cerium and titanium or chromium in the frit used in preparing the coating material. The ceramic coatings as previously indicated are especially suitable for adhering to stainless steels and the high temperature resistant nickel alloy commonly referred to as "Inconel," the latter containing approximately 15% chromium, 80% nickel and 5% iron by weight. The stainless steels found to be particularly suitable for use include those designated by numbers as 302, 310, 321 and 347 in the nomenclature originated by the American Iron and Steel Institute, the approximate compositions of which are indicated in the following table on a percent by weight basis:

| AISI Type No. | Carbon | Chromium | Nickel | Other Elements | Iron |
|---|---|---|---|---|---|
| 302 | 0.08–0.20 | 16.0–18.0 | 6.0–8.0 | Mn 2% max. | Remainder. |

(A general utility stainless steel)

| AISI Type No. | Carbon | Chromium | Nickel | Other Elements | Iron |
|---|---|---|---|---|---|
| 310 | 0.25 max | 24.0–26.0 | 19.0–22.0 | Mn 2% max. | Remainder. |

(For use at elevated temperatures)

| AISI Type No. | Carbon | Chromium | Nickel | Other Elements | Iron |
|---|---|---|---|---|---|
| 321 | 0.08 max | 17.0–19.0 | 8.0–11.0 | Ti min. 5×C | Remainder. |

(An 18-8 type stabilized against intercrystalline corrosion at elevated temperatures)

| AISI Type No. | Carbon | Chromium | Nickel | Other Elements | Iron |
|---|---|---|---|---|---|
| 347 | 0.08 max | 17.0–19.0 | 9.0–12 | Cb 10×C | Remainder. |

(A stabilized 18-8 for service at elevated temperatures)

The effective life of jet engine turbine or compressor parts either moving or stationary, and burner or afterburner parts, rocket combustion chambers and the like constructed from the aforesaid materials is materially extended when coated as described herein with the refractory vitreous ceramic coating materials constituting the present invention. The effectiveness of representative ceramic coatings applied to the indicated alloys is readily seen from the test data submitted below involving high temperature exposure of the coated materials for the designated periods of time.

| Ceramic Coating No. | Metal on Which Used | Long Heat Protection—Hours at Max. Temp., °F.[1] | |
|---|---|---|---|
| 353-2 | Inconel | 160 | 2,000 |
| 353-2 | 310, 321, 347 | 144 | 1,900 |
| 353-2 | 302 | 120 | 1,800 |
| 353-3 | Inconel | 160 | 2,000 |
| 353-3 | 321, 347 | 144 | 1,900 |
| 353-4 | Inconel | 144 | 1,900 |
| 353-4 | 310 | 144 | 1,900 |
| 418-1 | Inconel, 310, 321, 347 | 144 | 1,900 |
| 418-1 | 302 | 120 | 1,800 |
| 418-2 | Inconel | 160 | 2,000 |
| 418-2 | 321, 347 | 144 | 1,900 |
| 418-3 | 310 | 160 | 2,000 |
| 418-3 | Inconel | 144 | 1,900 |
| 418-4 | Inconel, 310 | 160 | 2,000 |
| 418-5 | Inconel | 160 | 2,000 |
| 418-5 | 321, 347 | 144 | 1,900 |

[1] Long heat protection as determined by "Accelerated life tests".

These tests are conducted at increasing temperatures. In the first complete cycle, 45 minutes of heating at 1600° F. is followed by 15 minutes of cooling in air. This procedure is followed for 8 hours, after which the specimen is allowed to heat continuously in the furnace for 16 hours. Three such cycles of 24 hour duration constitute a 72 hour long heat test. At its completion, in the accelerated life test, the 24 hour cycle is repeated at successive 100° F. increments of temperature until 2000° F. is reached or until failure occurs.

While in the foregoing specification a number of specific embodiments have been set forth and various specific details have been given, it will be apparent to those skilled in the art that many of the details can be varied widely without departing from the basic concept of the invention.

This application is a continuation-in-part of our copending application, Serial No. 283,525, filed April 21, 1952, now abandoned.

We claim:

1. An alkali-and alumina-free frit containing about:

| | Percent |
|---|---|
| $SiO_2$ | 34–40 |
| $B_2O_3$ | 5–10 |
| $BaO$ | 22–28 |
| $BiO_2$ | 8–12 |
| $CeO_2$ | 4–6.5 |
| $ZnO$ | 4–6 |
| $CaO$ | 4–6 |
| $TiO_2$ | 3–10 | based on the total weight of frit.

2. A frit consisting of about:

| | Percent (by weight) |
|---|---|
| $SiO_2$ | 37 |
| $B_2O_3$ | 8 |
| $BaO$ | 25 |
| $BiO_2$ | 10 |
| $CeO_2$ | 5 |
| $ZnO$ | 5 |
| $CaO$ | 5 |
| $TiO_2$ | 5 |
| | 100 |

3. A raw batch formula for the frit defined in claim 2, said batch consisting of about:

| | Percent (by weight) |
|---|---|
| Quartz | 31.2 |
| Boric acid | 12.0 |
| Barium carbonate | 26.3 |
| Bismuth trioxide | 6.2 |
| Bismuth nitrate | 4.2 |
| Cerium oxide | 4.2 |
| Zinc oxide | 4.2 |
| Calcium carbonate | 7.5 |
| Titanium dioxide | 4.2 |
| | 100.0 |

4. A frit used in making refractory vitreous ceramic coating material resistant to temperatures up to 2000° F. for prolonged periods of time, consisting of the oxides of silicon, 34 to 40%; barium, 22 to 28%; boron, 5 to 10%; titanium, from 61 to 78% by weight, and the balance of the components consisting of 8 to 12% of the oxides of bismuth, 4 to 6% calcium, 4 to 6% zinc, and 4 to 6.5% of cerium together with 3 to 10% of titanium oxide.

5. A frit used in making refractory vitreous ceramic coating material resistant to temperatures up to 2000° F. for prolonged periods of time, consisting, on a weight basis, a cumulative amount of from 61 to 78% of the oxides of silicon, boron and barium, respectively, from 8 to 12% bismuth oxide, and 10 to 20% of the oxides of the frit being calcium, zinc, and cerium together with a substantially equal amount of titanium oxide.

References Cited in the file of this patent

UNITED STATES PATENTS

| Re. 22,011 | Kinzie et al. | Jan. 20, 1942 |
| 2,244,360 | Gallup | June 3, 1941 |
| 2,332,423 | Zwermann | Oct. 19, 1943 |
| 2,396,856 | King | Mar. 19, 1946 |
| 2,414,633 | Bryant | Jan. 21, 1947 |
| 2,468,711 | King | Apr. 26, 1949 |
| 2,584,975 | Armistead | Feb. 12, 1952 |
| 2,590,894 | Sanborn | Apr. 1, 1952 |
| 2,663,658 | Schurecht | Dec. 22, 1953 |